United States Patent Office 3,047,627
Patented July 31, 1962

3,047,627
N-SUBSTITUTED-4,4-BIS-(4-HYDROXYPHENYL)
PENTANOIC ACID AMIDES
Sylvan Owen Greenlee, West Lafayette, Ind., assignor to S. C. Johnson & Son, Inc., Racine, Wis.
No Drawing. Filed Nov. 30, 1959, Ser. No. 855,956
6 Claims. (Cl. 260—559)

This invention relates to amides of hydroxyaryl-substituted aliphatic acids. More particularly, the invention relates to amides of 4,4 bis(hydroxyaryl) pentanoic acids and primary or secondary aliphatic monoamines having from 10 to about 36 carbon atoms.

It is an object of this invention to provide as new compositions, long chain amides of 4,4 bis(hydroxyaryl) pentanoic acids which are particularly valuable in the manufacture of protective coatings, adhesives, and molded articles.

Another object of this invention is to provide new compositions from 4,4 bis(hydroxyaryl) pentanoic acids and monoamines which have reactive phenolic hydroxyl groups capable of further reaction with suitable constituents to provide plasticity in the manufacture of fusible or infusible products.

These and other objects and advantages are obtained from the present invention, various novel features of which will become more fully apparent from the following description with particular reference to specific examples which are to be considered as illustrative only.

In the manufacture of heat conversion products from resinous materials, problems confronting the formulator include such problems as the selection of compatible reactants, the method of plasticizing the reaction mixture, or the method of contributing air-drying characteristics to the reaction mixture. Generally, it has been the experience that a reaction mixture which is quite satisfactory as to one of the above features may only be prepared at the expense of losing other characteristics of almost equal importance. For instance, whereas a particular plasticizer may be selected because of its compatibility with other components employed in a conversion mixture, products prepared therefrom may show inferior flexibility or chemical resistance.

Currently materials having reactive groups such as saturated acids, unsaturated acids, polyepoxide compositions, etc., are widely accepted in the manufacture of heat conversion products by reacting the materials with a coreactant whereby a complex product is obtained. Polyepoxides, for instance, are quite generally reacted with a polyfunctional co-reactant which serves to couple the polyepoxide through the epoxide groups to form a cross-linked polymeric product. Ingredients which have been found to be suitable for reaction with polyepoxides are such materials as amines, amides, thiols, and polyhydric phenols such as bis(4-hydroxyphenyl) dimethyl methane. These materials contain active hydrogen, i.e., those hydrogens attached to nitrogen, oxygen, or sulfur, and these active hydrogens will react with epoxide groups in the formation of a cross-linked product.

In general, the present invention contemplates the production of compositions having reactive phenolic hydroxyl groups, and which have chemically bound thereto by means of an amide linkage aliphatic chains of at least about 10 carbon atoms which provide plasticity, compatibility, and/or drying characteristics to the compositions. The compositions, having varying softening points and solubility characteristics, are extremely valuable in conjunction with materials such as acids, epoxides, or formaldehyde condensates reactive with the phenolic hydroxyl groups or with the ring structure in the preparation of flexible, heat converted final reaction products.

The novel amides in general may be derived by the reaction of an appropriate acid with primary or secondary amines. Since a hydrogen atom is removed from the nitrogen atom of the amine during amidification, when a secondary amine is employed, there are no hydrogens attached to the nitrogen atom of the amide prepared therefrom. When a primary amine is employed, one hydrogen will remain attached to the amido nitrogen after amidification. This amido hydrogen is reactive with epoxide groups; therefore, amides of primary monoamines are particularly valuable in conversions of polyepoxide compositions.

The hydroxyaryl substituted acids employed in the preparation of the amides of the invention are conveniently prepared by condensing a keto acid with the desired phenol. While the preferred embodiment of the invention contemplates the use of the pentanoic keto acid, i.e. levulinic acid, other keto acids or esters are operable wherein a keto group is connected to a carboxy or carboalkoxy radical through an alkylene radical of at least 2 carbon atoms. However, experience in the preparation of bisphenol and related compounds indicates that the carboxyl group of the keto acid should be positioned next to a terminal methyl group in order to obtain satisfactory yields. Therefore, even though the pentanoic keto acid, levulinic acid, is preferred and treated more fully herein, other keto acids such as the ketohexanoic and heptanoic acids are within the scope of the invention.

Prior applications, Serial No. 464,607 filed October 25, 1954, and Serial No. 489,300 filed February 18, 1955, now abandoned, disclose a number of illustrative compounds suitable for use as the pentanoic acid and methods of preparing the same. These materials which are referred to for convenience by the trade names Diphenolic Acid and DPA, consist of the condensation products of levulinic acid and phenol, substituted phenols or mixtures thereof. It is to be understood that the phenolic nuclei of the Diphenolic Acid may be substituted with any group which will not interfere with the reactions contemplated herein. Such groups are the halo, nitro and alkyl groups of from 1 to 5 carbon atoms. The chloro and bromo phenols are the preferred halogenated materials although it is possible to condense fluoro substituted phenols with a keto acid. The pentanoic acids derived from substituted phenols such as the alkylated phenols are more desirable for some applications than the products obtained from unsubstituted phenols due to properties imparted by the substituted groups. For example, the alkyl groups provide better organic solvent solubility, flexibility and water resistance. However, the unsubstituted product is usually more readily purified.

The monoamines which may be employed in the amidification of the Diphenolic Acid are the aliphatic amines having from 10 to 36 carbon atoms. These amines include such materials as lauryl amine, stearyl amine, and octadecadienyl amine.

The use of these amides for plasticizing resin compositions is advantageous over methods usually employed, since the plasticizing groups are chemically united to the reactants employed in the conversion. Such plasticizing groups not only cannot be leached out and do not evaporate from surfaces, but they also contribute greater flexibility, toughness, and chemical resistance to final reaction products. Amides prepared from unsaturated monoamines are particularly valuable in that the unsaturated portions may be employed for additional cross-linking. Flexible protective coating films, for instance, may be prepared from reaction mixtures containing these amides by preparing wet films from the reaction mixtures and subsequently curing these films by exposing them to air, or to heat and air, so that the conversion reactions which occur are accompanied by polymerization through the unsaturated portions. Usually no difficulty is encountered in preparing amides from the unsaturated amines. However, if the amides are prepared from amines which are extremely sensitive to polymerization through air oxidation of the unsaturated portions, well known procedures whereby oxygen is excluded from the amidification reaction can be employed.

The long-chain, saturated monoamines useful in preparing the amides of this invention may be conveniently prepared from natural oils such as the vegetable oils and fish oils. Typically, these materials are converted by reaction with ammonia to the amide, and the amides converted to amines by hydrogenation, or the oils may first be converted to the nitrile and then converted by hydrogenation to the amine. Usually such amines have chain lengths of from about 18 to 22 carbon atoms. Longer chain amines may be obtained, however, by the conversion of natural-occurring waxes which are esters of acids of up to 36 or more carbon atoms per chain.

Long-chain, unsaturated amines may be prepared by the selective reduction of amides prepared from vegetable or fish oils, carrying out the reduction so as not to hydrogenate the unsaturated portions present in the carbon chains. These amines have chain lengths of from about 18 to 36 carbon atoms per chain.

As is apparent from the above, a relatively large number of monoamines are suitable for use in preparing the herein described compositions. The monoamines may contain other functional groups, such as hydroxyl groups or unsaturated portions, so long as the groups do not interfere substantially with the preparation of the amide. The amine may contain halogen atoms, provided that the amidification is carried out in an acid medium so that appreciable reaction with the phenolic hydroxyl groups of the bis(hydroxyaryl) substituted acid is eliminated.

The method of preparing the amides of this invention will vary somewhat depending upon the properties of the reactants used in the preparation, and the properties of the amide resulting therefrom. Generally, the usual methods of amidification may be employed. For example, the amine may be reacted directly with the Diphenolic Acid, or it may be reacted with the ester of the acid, and amidification brought about by the application of heat using temperatures of up to about 225–250° C. Where low boiling amines are employed, lower temperatures may be advantageous, and it is often desirable to replenish the amine lost by volatilization, or carry out the reaction in a closed vessel to eliminate volatilization of the amine.

Usually, water formed during the amidification reaction may conveniently be removed as it is formed by azeotropic distillation with a hydrocarbon solvent, or by passing a stream of inert gas through the amidification mixture during the heating of the reaction mixture. If an ester is employed, volatile alcohols liberated during the reaction may also be removed by distillation as they are formed. Alcohols not removed by volatilization are often removed conveniently by washing.

The following examples will illustrate the invention; however, the invention is not intended to be limited thereby.

In the examples, proportions expressed are parts by weight unless otherwise indicated. Acid values represent the number of milligrams of KOH required to neutralize a one-gram sample. Amine values represent the number of milligrams of HCl required to neutralize a one-gram sample. The amine and acid values were determined by electrometric titration. Softening points were determined by Durrans' Mercury Method (Journal of Oil and Color Chemists' Association, 12, 173–175 [1929]).

*Example I*

In a 3-neck flask provided with a thermometer, mechanical agitator and reflux condenser attached through a water trap was placed a mixture of 286 parts of 4,4-bis(4-hydroxyphenyl) pentanoic acid and 274 parts of Armeen SD. This unsaturated monoamine composition is a distilled grade, primary amine marketed by Armour and Company and contains about 20% hexadecyl amine, 17% octadecyl amine, 26% octadecenyl amine, and 37% octadecadienyl amine. (The properties of this and other "Armeens" employed in the following examples are set forth in a publication entitled "Armeens, High Molecular Weight Aliphatic Amines," copyrighted 1954 by Armour Chemical Division, Armour and Company.) With continuous agitation, the mixture was heated to 155° C. and the temperature raised over the period of 1 hour to 190° C., then raised over a period of 18 minutes to 224° C. The water of condensation was permitted to volatilize during the reaction period. The product, amounting to 536 parts, had a softening point of 118° C., an amine value of 6, and an acid value of 16.

*Example II*

Using the apparatus of Example I, a mixture of 72 parts of 4,4-bis(4-hydroxyphenyl) pentanoic acid and 135 parts of Armeen 28 was prepared. Armeen 28 is a secondary amine marketed by Armour and Company, the alkyl chains of the amine being 20% hexadecyl, 20% octadecyl, 25% octadecenyl, 35% octadecadienyl. This mixture was heated to 130° C. and the temperature raised to 158° C. over a period of 2½ hours, then raised over a period of 3½ hours to 203° C. The water was permitted to volatilize during the reaction period. The product, amounting to 198 parts, was a viscous liquid having an amine value of 14.2 and an acid value of 0.9.

*Example III*

Using the apparatus of Example I, a mixture of 72 parts of 4,4-bis(4-hydroxyphenyl) pentanoic acid and 135 parts of Armeen 2T was prepared. Armeen 2T is a secondary amine marketed by Armour and Company, the alkyl chains being 30% hexadecyl, 25% octadecyl, and 45% octadecenyl. This mixture was heated to 200° C. over a period of 30 minutes, and held at 190–220° C. for 5¾ hours, permitting water to volatilize during the reaction period. The product amounting to 187 parts, was a viscous liquid having an amine value of 15 and an acid value of 0.

*Example IV*

Using the apparatus of Example I, a mixture of 573 parts of 4,4-bis(4-hydroxyphenyl) pentanoic acid and 315 parts of decylamine was heated at 170° C. for a period of 32 hours. The pressure was reduced to 60 mm. during the last 30 minutes of heating in order to remove the volatile unreacted amine. The product, amounting to 750 parts, had an acid value of 1.1, an amine value of 1.0, and a softening point of 142° C.

*Example V*

Using the apparatus of Example I, a mixture of 429 parts of 4,4-bis(4-hydroxyphenyl) pentanoic acid and 278 parts of dodecyl amine was heated for a period of 21 hours at 190° C. An additional 20 parts of dodecyl amine was added and the heating continued for 2 hours at 190° C. The pressure was reduced to 60 mm. pressure during the last 30 minutes of heating to remove the volatile unreacted amine. The product, amounting to 680 parts, had an acid value of 31.1, an amine value of 1.8, and a softening point of 138° C.

*Example VI*

Using the apparatus of Example I, a mixture of 573 parts of 4,4-bis(4-hydroxyphenyl) pentanoic acid and 540 parts of octadecyl amine was heated for a period of 25 hours at 150–170° C. An additional 37 parts of octadecyl amine was added and heating continued at 150–170° C. for a period of 8 hours. The pressure during the last 30 minutes of heating was reduced to 60 mm. The product, amounting to 1087 parts, had an acid value of 3.2, an amine value of 1.1, and a softening point of 142° C.

In Examples I through VI inclusive, the Diphenolic Acid can be replaced by other diphenol carboxylic acids including acids containing chloro, bromo, nitro and alkyl groups of 1 to 5 carbon atoms such as 4,4-bis(4-hydroxy-3-ethyl phenyl)-pentanoic acid,
4,4-bis(4-hydroxy-2-ethyl phenyl)-pentanoic acid,
4,4-bis(2-hydroxy-4-butyl phenyl)-pentanoic acid,
4,4-bis(4-hydroxy-3-nitro phenyl)-pentanoic acid,
4,4-bis(2-hydroxy-3-nitro-phenyl)-pentanoic acid,
4,4-bis(4-hydroxy-3-methyl-phenyl)-pentanoic acid,
4,4-bis(4-hydroxy-3-amyl phenyl)-pentanoic acid,
4,4-bis(4-hydroxy-3-chloro phenyl)-pentanoic acid,
4-(4-hydroxyphenyl)-4-(4-hydroxy-3-amyl phenyl)-pentanoic acid,
4-(4-hydroxy-phenyl)-4-(2-hydroxy-4-chlorophenyl)-pentanoic acid,
4-(4-hydroxyphenyl)-4-(4-hydroxy-3,5-dibromo phenyl)-pentanoic acid,
4-(4-hydroxyphenyl)-4-(2-hydroxy-4-nitro phenyl)-pentanoic acid,
4-(4-hydroxyphenyl)-4-(4-hydroxy-3-sulfo phenyl)-pentanoic acid,
4-(4-hydroxyphenyl-4-(2-hydroxy-3,5-dimethyl phenyl)-pentanoic acid,
5,5-bis(4-hydroxy phenyl)-hexanoic acid,
5,5-bis(4-hydroxy-3-methyl phenyl)-hexanoic acid,
5,5-bis(4-hydroxyl-3-nitro phenyl)-hexanoic acid,
and 5,5-bis(4-hydroxyl-3-chloro phenyl)-hexanoic acid.

In Examples I to VI inclusive, the monoamines can be replaced by other primary and secondary monoamines having from 10 to 36 carbon atoms in the hydrocarbon chain.

The amides of this invention have been found to be extremely valuable as converting agents in the conversion of epoxide compositions to flexible, insoluble, infusible products useful as protective coatings. The active hydrogens present in the amide reacting with the epoxide groups of the epoxide composition to form cross-linked polymeric products. The following examples illustrate the utility of the compounds of this invention in the conversion of epoxide compositions.

The epoxide compositions used in the following examples were complex epoxides prepared by the condensation of bis(4-hydroxyphenyl) dimethyl methane with molar excess of epichlorohydrin in varying amounts, and commercially available as Epon resins marketed by Shell Chemical Company. The epoxides employed have the following general formulas where $n$ indicates the degree of polymerization which has occurred in their preparation:

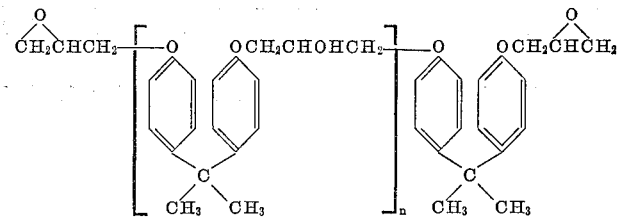

The following table gives the properties of the Epon resins employed.

| Epon Resin Type | Melting Point, ° C. | Viscosity[1] (Gardner-Holdt) | Epoxide Equivalent | Average Molecular Weight |
|---|---|---|---|---|
| 864 | 40–45 | A₁–B | 325 | 450 |
| 1001 | 64–76 | C–G | 480 | 640 |
| 1007 | 127–133 | Y–Z | 1,750 | |

[1] On 40% nonvolatile in butyl carbitol at 25° C.

The average molecular weight was determined by standard boiling point elevation method. The epoxide values were determined by refluxing for 30 minutes a 2-gram sample of the epoxide composition with 50 milliliters of pyridine hydrochloride in excess pyridine. After cooling to room temperature, the sample is then back-titrated with standard alcoholic sodium hydroxide.

In the examples, the epoxide resins and amide were first dissolved in methyl isobutyl ketone to a nonvolatile content of 50%. The parts referred to are parts by weight based on the nonvolatile content.

*Example VII*

A mixture was prepared from 39.7 parts of the product of Example IV, 175 parts of Epon 1007, and 0.14 part sodium ethoxide. Flms of .002″ thickness were prepared from this mixture and baked for ½ hour at 150° C. to yield hard, tough, flexible products which were tack-free at this curing temperature. No cloudiness was observed after volatilization of the solvent, indicating complete miscibility of the reactants. When the wet films were cured by heating them for ½ hour at 200° C., the infusible films obtained showed no cloudiness and retained their flexibility. These films withstood aqueous 5% sodium hydroxide for 48 hours without deterioration.

*Example VIII*

A mixture was prepared from 131 parts of the product of Example III, 350 parts of Epon 864, and 5.4 parts sodium ethoxide. Clear, infusible, flexible products were obtained when .002″ wet films were prepared from the mixture and cured for ½ hour at 150° C. When the wet films were cured for ½ hour at 200° C. the infusible films obtained showed no cloudiness and retained their flexibility, and these films withstood boiling water for 16 hours and aqueous 5% sodium hydroxide for 48 hours without deterioration.

*Example IX*

As in Example VIII, .002″ wet films were prepared from a mixture of 50 parts of Epon 1001, 20 parts of the product of Example I, and 0.54 part sodium ethoxide. Hard, clear, tough, flexible products were obtained by heating these films for ½ hour at 150° C. When the wet films were cured by heating them for ½ hour at 200° C., clear films were obtained which were flexible and infusible.

Additionally, the amides of the present invention can be used to modify urea-formaldehyde or phenol-formaldehyde resins contributing superior plasticity and compatibility, as well as in many instances, superior drying and chemical resistance. Apparently, the formaldehyde resins are chemically bonded to the amide modifying component. A particularly advantageous application of such a modified formaldehyde resin is in interior coatings of sheet metal cans. It is well known that certain products such as meats, etc. are difficult to remove from a metal container because of the adherence of the packed material to the container. The removal of such goods is often a source of considerable annoyance to the housewife. It has been found that the long-chain saturated amides of this invention, when used in release coatings for metal containers, eliminate much of the problem.

Additionally, the present amides as plasticizers have been found to be compatible with many vinyl polymers and exhibit no exudation of plasticizer even when the plasticizer is used in relatively large amounts. The plasticized films are clear, transparent and relatively stable to high boiling materials. Further, the 4,4 bis(hydroxyaryl) pentanoic acid amides disclosed herein can be used to modify alkyl resins and as effective corrosion and tarnish inhibitors.

While various embodiments of this invention have been described, it should be understood that the invention is not restricted thereto, and that it is intended to cover all modifications of the invention which would be apparent to one skilled in the art and that come within the scope of the appended claims. This application is a continuation-in-part of my application Serial No. 564,886 filed February 13, 1956, entitled Substituted Amides of Hydroxyaryl Aliphatic Acids, now abandoned.

It is claimed and desired to secure by Letters Patent:

1. As a composition of matter, the amide having the formula:

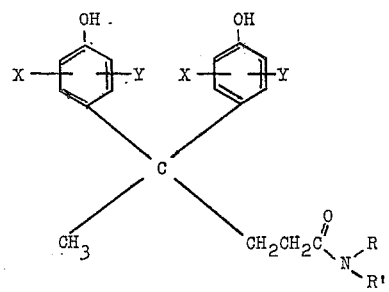

wherein X and Y are members of the group consisting of hydrogen and lower alkyl; R is a member selected from a group consisting of hydrogen, unsaturated aliphatic hydrocarbon radical of from 10–36 carbon atoms and saturated aliphatic hydrocarbon radical of from 10–36 carbon atoms; and R' is a member selected from a group consisting of unsaturated aliphatic radical of from 10–36 carbon atoms and saturated aliphatic radical of from 10–36 carbon atoms.

2. As a composition of matter, the amide:

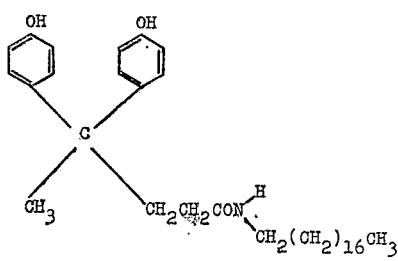

3. As a composition of matter, the amide:

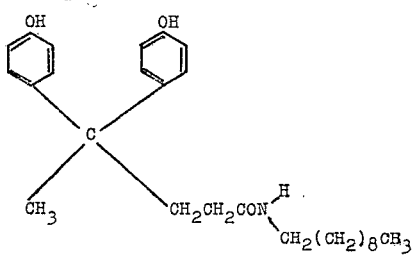

4. As a composition of matter, the amide:

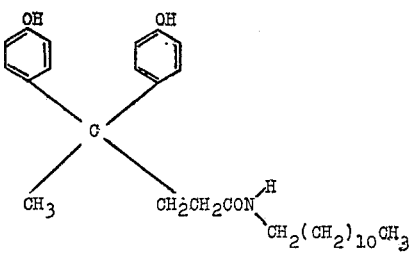

5. As a composition of matter, the amide:

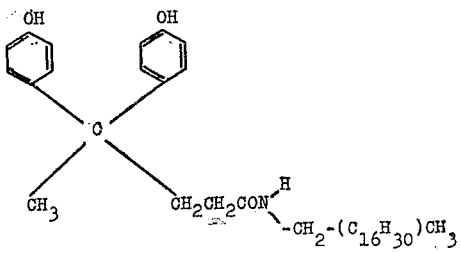

6. As a composition of matter, the amide:

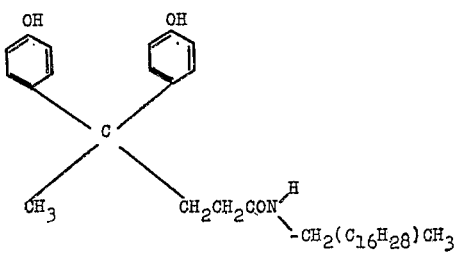

References Cited in the file of this patent

UNITED STATES PATENTS

| | | |
|---|---|---|
| 2,893,965 | Greenlee | July 7, 1959 |
| 2,907,728 | Greenlee | Oct. 6, 1959 |
| 2,933,517 | Greenlee | Apr. 19, 1960 |
| 2,933,520 | Bader | Apr. 19, 1960 |
| 2,933,528 | Greenlee | Apr. 19, 1960 |

FOREIGN PATENTS

| | | |
|---|---|---|
| 215,238 | Australia | Nov. 1, 1956 |